(12) United States Patent
Fukunishi

(10) Patent No.: US 9,978,144 B2
(45) Date of Patent: May 22, 2018

(54) BIOLOGICAL INFORMATION MEASUREMENT APPARATUS, BIOLOGICAL INFORMATION MEASUREMENT METHOD, AND COMPUTER-READABLE RECORDING MEDIUM

(71) Applicant: OLYMPUS CORPORATION, Hachioji-shi, Tokyo (JP)

(72) Inventor: Munenori Fukunishi, Kunitachi (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 15/392,431

(22) Filed: Dec. 28, 2016

(65) Prior Publication Data

US 2017/0178326 A1    Jun. 22, 2017

Related U.S. Application Data

(63) Continuation of application No. PCT/JP2015/085417, filed on Dec. 17, 2015.

(51) Int. Cl.
*G06T 7/00* (2017.01)
*G06T 7/20* (2017.01)
*G06T 5/40* (2006.01)

(52) U.S. Cl.
CPC .............. *G06T 7/0012* (2013.01); *G06T 7/20* (2013.01); *G06T 5/40* (2013.01);
(Continued)

(58) Field of Classification Search
CPC ......... G06T 7/0012; G06T 2207/10024; G06T 2207/30076; G06T 7/20; G06T 5/40;
(Continued)

(56) References Cited

U.S. PATENT DOCUMENTS

2011/0235877 A1* 9/2011 Morita ............... A61B 1/00009
382/128
2014/0210973 A1* 7/2014 Takahashi ................ A61B 1/04
348/65
(Continued)

FOREIGN PATENT DOCUMENTS

JP          01280442 A      11/1989
JP          04017076 A      1/1992
(Continued)

OTHER PUBLICATIONS

International Search Report (ISR) and Written Opinion dated Mar. 8, 2016 issued in International Application No. PCT/JP2015/085417.

(Continued)

*Primary Examiner* — Stephen R Koziol
*Assistant Examiner* — Shaghayegh Azima
(74) *Attorney, Agent, or Firm* — Holtz, Holtz & Volek PC

(57) ABSTRACT

A biological information measurement apparatus includes: a plurality of first pixels configured to generate a first imaging signal based on received light; a plurality of second pixels configured to generate a second imaging signal based on the received light; a time series signal generation unit configured to generate a first time series signal by connecting representative values of first imaging signals in time series and generate a second time series signal by connecting representative values of second imaging signals in time series; a signal component separation unit configured to separate a plurality of signal components from each of the first and second time series signals; and a biological information component selector configured to select a signal component in accordance with the biological information, among the plurality of signal components separated by the signal component separation unit.

5 Claims, 16 Drawing Sheets

(52) U.S. Cl.
CPC ............... *G06T 2207/10004* (2013.01); *G06T 2207/10024* (2013.01); *G06T 2207/30076* (2013.01)

(58) Field of Classification Search
CPC .............. A61B 1/00009; A61B 1/0646; A61B 1/00186; G06K 9/2018
See application file for complete search history.

(56) References Cited

U.S. PATENT DOCUMENTS

| | | | | |
|---|---|---|---|---|
| 2014/0221794 | A1* | 8/2014 | Yamaguchi | A61B 1/00009 600/322 |
| 2015/0173630 | A1* | 6/2015 | Uchida | A61B 5/024 600/479 |
| 2016/0109393 | A1* | 4/2016 | Mandelis | G01N 25/72 73/606 |
| 2017/0303862 | A1* | 10/2017 | Nakamura | A61B 5/7275 |

FOREIGN PATENT DOCUMENTS

| | | |
|---|---|---|
| JP | 5672144 B2 | 2/2015 |
| WO | 2014038077 A1 | 3/2014 |

OTHER PUBLICATIONS

Poh, et al. "Non-contact, automated cardiac pulse measurements using video imaging and blind source separation", Optics Express, vol. 18, Issue 10, May 10, 2010, pp. 10762-10774.
Wim Verkruysse, et al., "Remote plethysmographic imaging using ambient light", Opt. Express, Dec. 22, 2008, vol. 16, No. 26, 16 Pages.

* cited by examiner

WAVELENGTH (nm)

FEATURE DATA 1

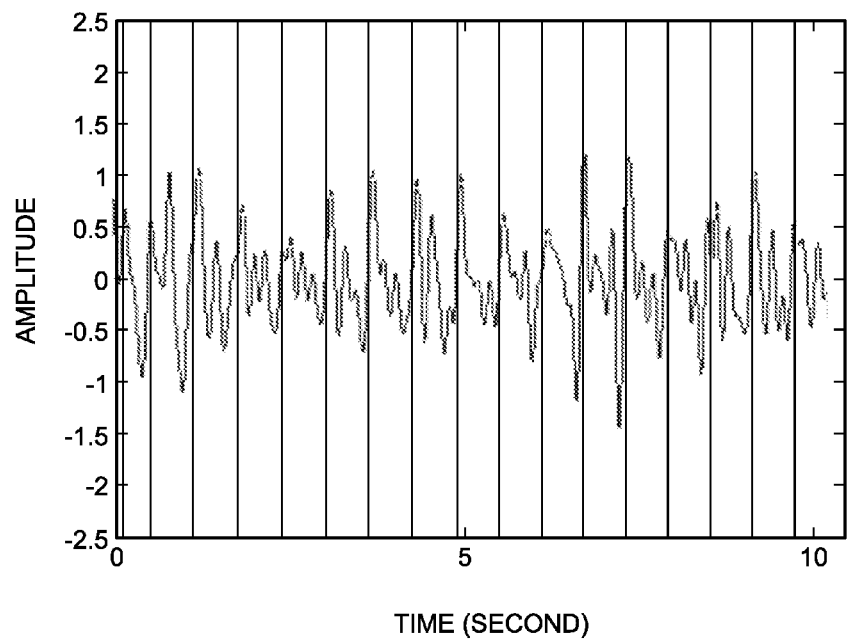
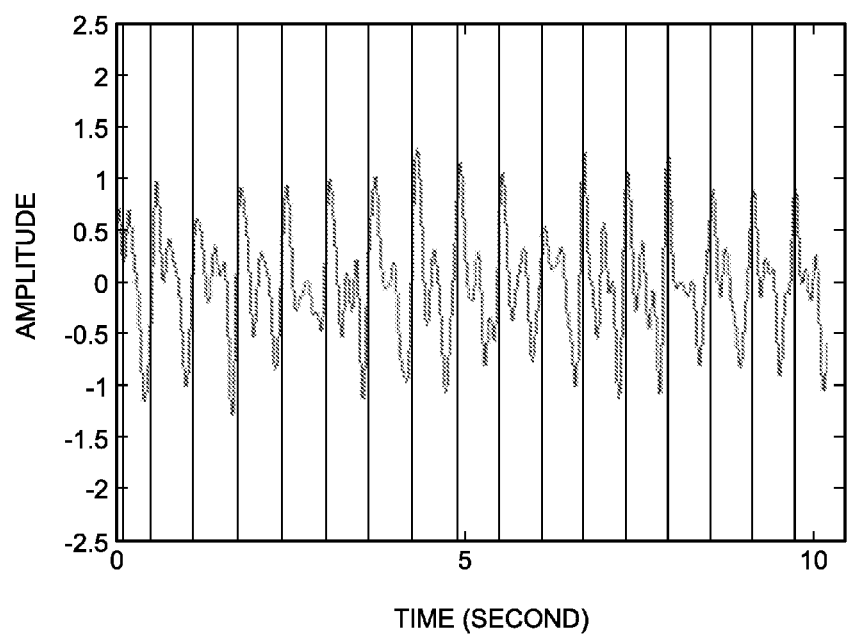

BIOLOGICAL INFORMATION MEASUREMENT APPARATUS, BIOLOGICAL INFORMATION MEASUREMENT METHOD, AND COMPUTER-READABLE RECORDING MEDIUM

CROSS-REFERENCE TO RELATED APPLICATION

This application is a continuation of International Application No. PCT/JP2015/085417, filed on Dec. 17, 2015, the entire contents of which are incorporated herein by reference.

BACKGROUND

1. Technical Field

The disclosure relates to a biological information measurement apparatus that measures biological information on the basis of an image, a biological information measurement method, and a computer-readable recording medium.

2. Related Art

Non-contact video based measurement of physiological status is useful for healthcare applications, medical diagnosis, and affective computing. With recent advances in mobile technology, various techniques have been proposed for the measurement of non-contact heart rate (HR) and the blood volume pulse (BVP) detection. For example, Verkruysse et al. [1] demonstrated the measurement of BVP under ambient light using the G channel of movies captured by a consumer camera. Poh et al. [2] also developed a remote BVP measurement technique using a low-cost webcam, based on blind source separation, which can be used to calculate HR, and the high- and low-frequency (HF and LF) components of heart rate variability (HRV). Refer to [1] W. Verkruysse, L. O. Svaasand and J. S. Nelson, "Remote plethysmographic imaging using ambient light," Opt. Exp., vol. 16, no. 26, pp. 21434-21445, (2008), and [2] Poh, M. Z., McDuff, D., and Picard, R. Non-contact, automated cardiac pulse measurements using video imaging and blind source separation. Optics Express, Vol. 18, Issue 10, pp. 10762-10774, 2010.

In the technique disclosed in JP 5672144 B and Poh, M. Z., McDuff, D., and Picard, R. Non-contact, automated cardiac pulse measurements using video imaging and blind source separation. Optics Express, Vol. 18, Issue 10, pp. 10762-10774, 2010, a plurality of one-dimensional signals is generated by arranging signal values of individual color components of red (R), green (G), and blue (B) in time series, on the basis of an image signal obtained by imaging a face region of a subject, and a heart rate component is extracted by separating a signal component using independent component analysis (ICA).

SUMMARY

In some embodiments, a biological information measurement apparatus configured to measure biological information based on subject images obtained sequentially in time series is provided. the apparatus includes: a plurality of first pixels where each first pixel includes a sensitivity range in a hemoglobin absorption wavelength band and is configured to generate a first imaging signal based on received light; a plurality of second pixels where each second pixel includes a longer wavelength-side sensitivity range on a longer wavelength side of the sensitivity range of the first pixel and a shorter wavelength-side sensitivity range on a shorter wavelength side of the sensitivity range of the first pixel and is configured to generate a second imaging signal based on the received light, each of the longer wavelength-side sensitivity range and the shorter wavelength-side sensitivity range having a width smaller than the width of the sensitivity range of the first pixel; a time series signal generation unit configured to: generate a first time series signal by connecting representative values of first imaging signals in time series, the first imaging signals being generated in time series; and generate a second time series signal by connecting representative values of second imaging signals in time series, the second imaging signals being generated in time series; a signal component separation unit configured to separate a plurality of signal components from each of the first and second time series signals; and a biological information component selector configured to select a signal component in accordance with the biological information, among the plurality of signal components separated by the signal component separation unit.

In some embodiments, a biological information measurement method executed by a biological information measurement apparatus configured to measure biological information based on subject images obtained sequentially in time series is provided. The method includes: generating a first imaging signal based on received light by a plurality of first pixels where each first pixel includes a sensitivity range in a hemoglobin absorption wavelength band; generating a second imaging signal based on the received light by a plurality of second pixels where each second pixel includes a longer wavelength-side sensitivity range on a longer wavelength side of the sensitivity range of the first pixel and a shorter wavelength-side sensitivity range on a shorter wavelength side of the sensitivity range of the first pixel, each of the longer wavelength-side sensitivity range and the shorter wavelength-side sensitivity range having a width smaller than the width of the sensitivity range of the first pixel; generating a first time series signal by connecting representative values of first imaging signals in time series, the first imaging signals being generated in time series; generating a second time series signal by connecting representative values of second imaging signals in time series, the second imaging signals being generated in time series; separating a plurality of signal components from each of the first and second time series signals; and selecting a signal component in accordance with the biological information, among the plurality of signal components separated by the signal component separation unit.

In some embodiments, a non-transitory computer-readable recording medium recording a biological information measurement program for measuring biological information based on subject images obtained sequentially in time series is provided. The program instructs a computer to execute: generating a first imaging signal based on received light by a plurality of first pixels where each first pixel includes a sensitivity range in a hemoglobin absorption wavelength band; generating a second imaging signal based on the received light by a plurality of second pixels where each second pixel includes a longer wavelength-side sensitivity range on a longer wavelength side of the sensitivity range of the first pixel and a shorter wavelength-side sensitivity range on a shorter wavelength side of the sensitivity range of the first pixel, each of the longer wavelength-side sensitivity range and the shorter wavelength-side sensitivity range having a width smaller than the width of the sensitivity range of the first pixel; generating a first time series signal by connecting representative values of first imaging signals in time series, the first imaging signals being generated in time series; generating a second time series signal by connecting representative values of second imaging signals in time series, the second imaging signals being generated in time series; separating a plurality of signal components from each of the first and second time series signals; and selecting a signal component in accordance with the biological information, among the plurality of signal components separated by the signal component separation unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a diagram illustrating a relationship between the sensitivity characteristic of the second pixel and heart rate detection;

FIG. 21 is a diagram illustrating a relationship between the sensitivity characteristic of the second pixel and heart rate detection;

DETAILED DESCRIPTION

Hereinafter, embodiments of the disclosure will be described in detail with reference to the drawings. Note that the disclosure is not limited to the following embodiments. The drawings referred to in the following description merely schematically illustrate the shapes, sizes, and positional relations to such degrees that the contents of the disclosure are understandable. Accordingly, the present invention is not limited to the shapes, sizes, and positional relations exemplified in the individual drawings. In the description, a same reference sign will be given to a same configuration.

Figure 1:
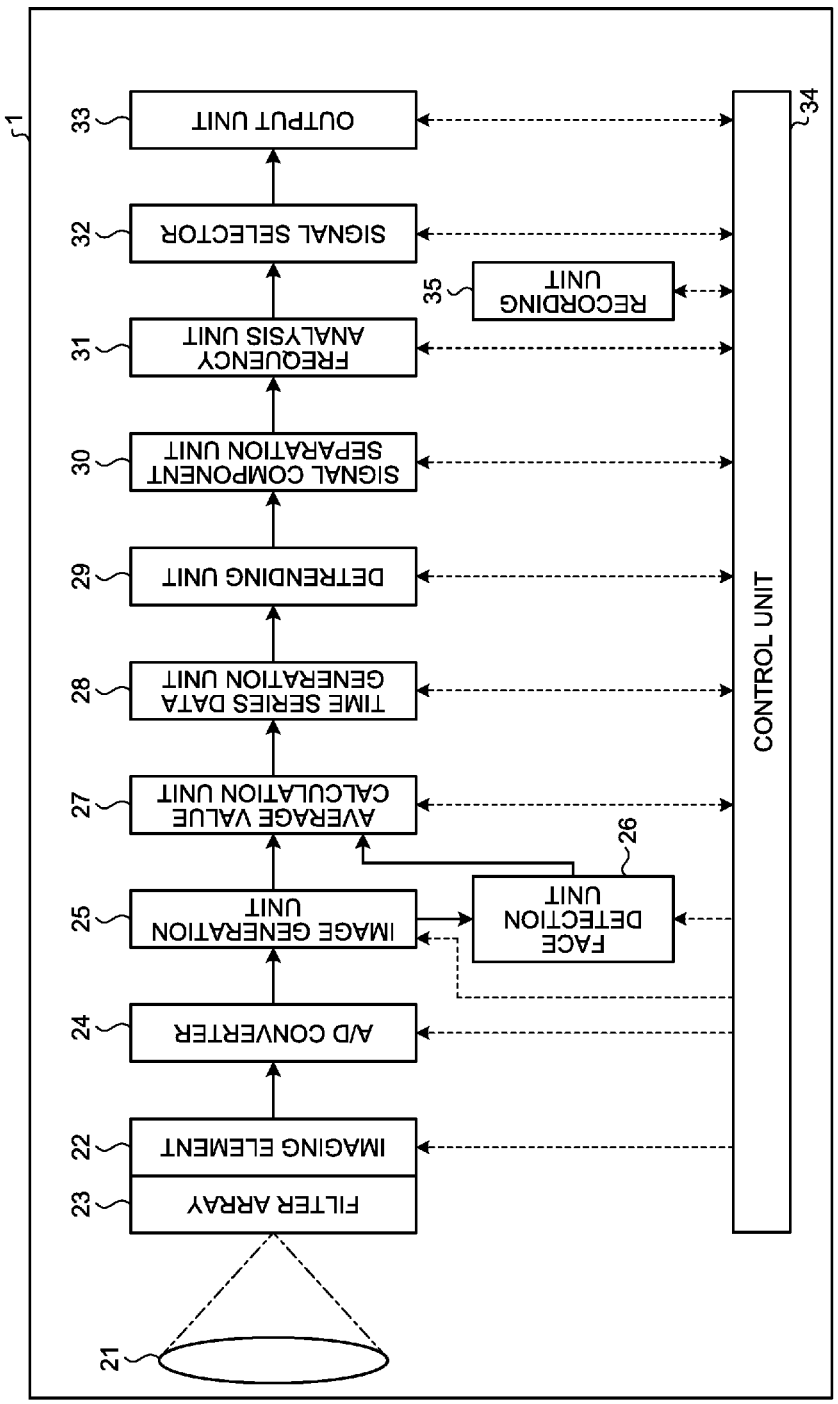
FIG. 1 is a block diagram illustrating a functional configuration of a biological information measurement apparatus according to an embodiment of the disclosure.

FIG. 1 is a block diagram illustrating a functional configuration of biological information measurement apparatus according to an embodiment of the disclosure. A biological information measurement apparatus 1 illustrated in FIG. 1 includes an optical system 21, an imaging element 22, a filter array 23, an A/D converter 24, an image generation unit 25, a face detection unit 26, an average value calculation unit 27, a time series data generation unit 28, a detrending unit 29, a signal component separation unit 30, a frequency analysis unit 31, a signal selector 32, an output unit 33, a control unit 34, and a recording unit 35.

The optical system 21 includes one or more lenses, e.g., a focus lens and a zoom lens, a diaphragm, and a shutter, and forms an image of a subject on a light receiving surface of the imaging element 22.

The imaging element 22 receives an optical image of the subject passing through the filter array 23 and performs photoelectric conversion, thereby generating image data sequentially in accordance with a predetermined frame (60 fps). The imaging element 22 is formed with a complementary metal oxide semiconductor (CMOS), a charge coupled device (CCD), or the like, in which each of a plurality of two-dimensionally arranged pixels photoelectrically converts light passing through the filter array 23 and generates electrical signals.

Figures 2, 3:
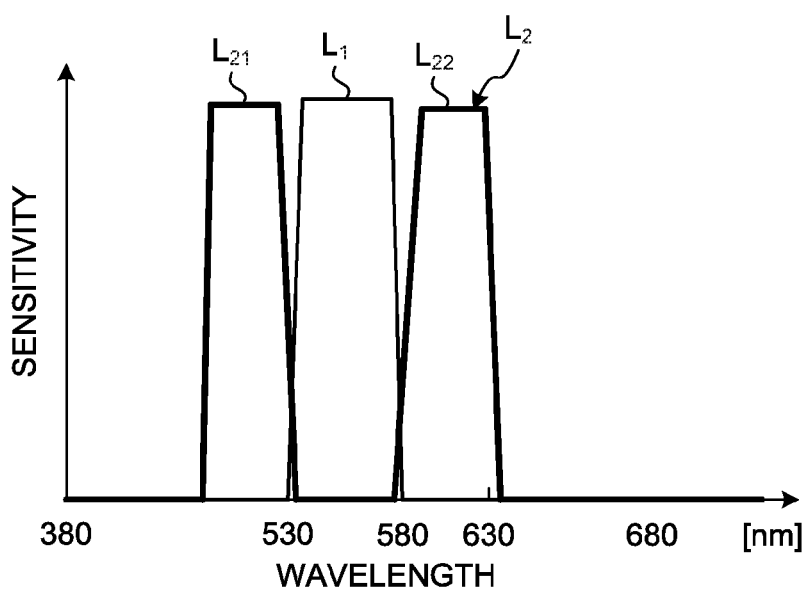
FIG. 2 is a diagram illustrating a configuration of an imaging element according to an embodiment of the disclosure.
FIG. 3 is a diagram illustrating an exemplary sensitivity characteristic of an imaging element according to an embodiment of the disclosure.

The filter array 23 is arranged on the light receiving surface of the imaging element 22. FIG. 2 is a diagram illustrating a configuration of the imaging element 22. The filter array 23 includes a first filter and a second filter, being arranged in a matrix form, or in a predetermined pattern, corresponding to each of the pixels constituting the imaging element 22. The first filter transmits light having a wavelength band of 530 nm to 590 nm. The second filter transmits light having a wavelength band of 500 nm to 530 nm and a wavelength band of 590 nm to 620 nm. Note that in the following, as illustrated in FIG. 2, the pixel in which the first filter is arranged will be referred to as a first pixel $P_1$, and the pixel in which the second filter is arranged will be referred to as a second pixel $P_2$.

FIG. 3 is a diagram illustrating an exemplary sensitivity characteristic of the imaging element 22. In FIG. 3, the horizontal axis represents wavelength (nm) and the vertical axis represents sensitivity. Moreover, in FIG. 3, a curve $L_1$ represents a sensitivity characteristic of the first pixel $P_1$ in which the first filter is provided, and a curve $L_2$ represents a sensitivity characteristic of the second pixel $P_2$ in which the second filter is provided.

Specifically, the first pixel $P_1$ is configured such that the first filter transmits the light having a wavelength band of 530 nm to 590 nm, and thus, has sensitivity (peak) toward the light having the wavelength band of 530 nm to 590 nm. The first pixel $P_1$ receives the light transmitted through the first filter and generates an electrical signal. Hereinafter, a plurality of electrical signals generated by the first pixel $P_1$ will be collectively referred to as a first imaging signal.

The second pixel $P_2$ receives the light having the wavelength band of 500 nm to 530 nm and a wavelength band of 590 nm to 620 nm, transmitted through the second filter. The curve $L_2$ indicating sensitivity of the second pixel $P_2$ includes a first curve $L_{21}$ having sensitivity (peak) toward the light having a wavelength band (sensitivity range on shorter wavelength side) of 500 nm to 530 nm, more toward the shorter wavelength side than the sensitivity range of the first pixel $P_1$, and a second curve $L_{22}$ having sensitivity (peak) toward the light having a wavelength band (sensitivity range on longer wavelength side) of 590 nm to 620 nm, more toward the longer wavelength side than the sensitivity range of the first pixel $P_1$. Note that the sensitivity range of the second pixel $P_2$ may overlap with a portion of the sensitivity range of the first pixel $P_1$, and may have a slight sensitivity in a sensitivity range of the first pixel $P_1$. The second pixel $P_2$ receives the light transmitted through the second filter and generates an electrical signal. Moreover, the width of the sensitivity range of the second pixel $P_2$ is smaller than the width of the sensitivity range of the first pixel $P_1$. Hereinafter, a plurality of electrical signals generated by the plurality of second pixels $P_2$ will be collectively referred to as a second imaging signal.

Returning to FIG. 1, the A/D converter 24 converts analog first and second imaging signals (image data) input from the imaging element 22 into digital image data (RAW image data) and outputs the converted data to the image generation unit 25. The A/D converter 24 sequentially converts the analog image data sequentially output frame-by-frame from the imaging element 22 into RAW image data and inputs the converted data into the image generation unit 25.

The image generation unit 25 obtains the RAW image data generated by the A/D converter 24, performs image generation processing onto the data, and generates developed image data to which first luminance and second luminance are attached. The first luminance corresponds to a signal value of each of electrical signals of a first imaging signal. The second luminance corresponds to a signal value of each of electrical signals of a second imaging signal. The image generation unit 25 inputs generated developed image data into each of the face detection unit 26 and the average value calculation unit 27. The image generation unit 25 may generate a developed image using demosaic processing of generating a plurality of channel data sets for each of pixels by interpolating each of channels with surrounding pixels, or may generate the developed image by calculating an average value of each of the channels of neighboring regions from the RAW image data. In this case, the image size of the RAW image data and the image size of the developed image need not be equal to each other.

Using a known method such as pattern matching, the face detection unit 26 detects a region including the face of the subject (hereinafter, also referred to as a face region) included in the image corresponding to the developed image data input from the image generation unit 25 and inputs a detection result into the average value calculation unit 27. Detection of the region including the face of the subject may be performed by using a known face detection algorithm such as active appearance models (AAMs), active shape models (ASMs), and constrained local models (CLMs). Examples of these include Sauer, P., Coates, T., Taylor, C.: Accurate regression procedures for active appearance models. In: British Machine Vision Conference. (2011), and Cootes, T., Taylor, C., Cooper, D., Graham, J., et al.: Active shape models-their training and application. Computer vision and image understanding 61 (1995) 38-59, Cristinacce, D., Coates, T.: Automatic feature localisation with constrained local models. Journal of Pattern Recognition 41 (2008) 3054-3067.

Figure 4:
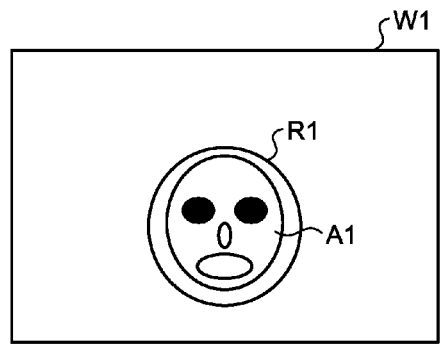
FIG. 4 is a diagram illustrating an exemplary developed image corresponding to image data generated by an imaging element according to an embodiment of the disclosure.

FIG. 4 is a diagram illustrating an exemplary developed image corresponding to image data generated by the imaging element 22 according to an embodiment of the disclosure. As illustrated in FIG. 4, the face detection unit 26 detects a face region R1 including the face of a subject A1 using a known technique such as pattern matching toward a predetermined range image that corresponds to the image data of each of pixel values for a predetermined pixel region included in a developed image W1.

The average value calculation unit 27 obtains developed image data generated by the image generation unit 25 and a detection result for the face region detected by the face detection unit 26, and calculates an average value of each of the first luminance and the second luminance. The first luminance represents the signal value of the electrical signal included in the first imaging signal in the face region. The second luminance represents the signal value of the electrical signal included in the second imaging signal in the face region. The average value calculation unit 27 inputs the data related to the calculated average values into the time series data generation unit 28.

The time series data generation unit 28 generates first time series data (time series signals) by connecting, in time series, the average values of the first luminance of a fixed period of time (fixed number of frames), calculated by the average value calculation unit 27 and generates second time series data (time series signals) by connecting, in time series, the average values of the second luminance of a fixed period of time (fixed number of frames), calculated by the average value calculation unit 27. This operation generates first time series data connecting first luminance values in time series, and generates second time series data connecting second luminance values in time series. The time series data generation unit 28 inputs the generated first and second time series data into the detrending unit 29.

The detrending unit 29 generates the first and second time series data obtained by removing offset components (trend) varying over time from the first and second time series data generated by the time series data generation unit 28. Specifically, the detrending unit 29 generates the first and second time series data obtained by removing low frequency components using a high-pass filter, or the like. The detrending unit 29 inputs the detrended first and second time series data into the signal component separation unit 30.

Note that, while the time series data generation unit 28 generates time series data on the basis of a signal average value for the same face region, the subject (face detection target) is not necessarily in a static state, and illumination environment is not always fixed. Therefore, the time series data gradually vary in a magnitude of the average value level with time. The ultimate purpose of the disclosure is to select a heart rate signal by the signal selector 32 and to detect a signal variation component of 30 to 200 times/minute, equivalent to the heart rate variation component. In practice, however, since the signal variation component with a cycle longer than 30 times/minute in this detrending processing is considered to be due to a factor other than the heart rate, it would be preferable to remove this component. According to the present embodiment, the detrending unit 29 removes an offset component gradually varying over time, from time series data before undergoing detrending so as to generate detrended time series data.

The signal component separation unit 30 obtains the detrended first and second time series data from the detrending unit 29 and separates a plurality of signal components from each of the first and second time series data. The signal component separation unit 30 inputs the separated signal components into the frequency analysis unit 31. Exemplary signal component separation processing performed by the signal component separation unit 30 include independent component analysis (ICA), time frequency masking (TFM), space coding, non-negative matrix factorization (NMF). For example, in the case of separating signal components using ICA, when original signal s(t) is given with the following vector, an n-th order signal component of s(t) is stochastically independent with each other, and it is assumed that the original signals are weighted and combined into the observation signals (herein, time series data) using a mixing matrix A, in formulization, an observation signal x(t) is given by the following formula (1).

$$x(t) = A \cdot s(t) \quad (1)$$

where, $x(t) = [x_1(t), x_2(t), \ldots, x_n(t)]^T$
$s(t) = [s_1(t), s_2(t), \ldots, s_n(t)]^T$ By obtaining a transformation matrix W in the following formula (2) under the assumption that the observation signal x(t) is uniquely obtained as a data signal and each of the components of s(t) is stochastically independent with each other, it is possible to obtain the original signal s(t).

$$s(t) = W x(t) \quad (2)$$

By obtaining the transformation matrix W on the basis of the fact that correlation between the signals becomes minimum ($E\{y(t)y^T(t)\} \rightarrow \text{diag}$) when a separation signal $y(t) = [y_1(t), y_2(t), \ldots, y_n(t)]^T$, it is possible to separate the signals such that the signal components are stochastically independent with each other. Note an optimum transformation matrix may be obtained by performing decorrelation of higher order correlation ($E\{y^3(t)y^T(t)\} \rightarrow \text{diag}$), and decorrelation of a probability density function of the original signal ($E\{\Phi(y(t))y^T(t)\} \rightarrow \text{diag}$, where $\Phi(\ )$ is a sigmoid function), or the like.

Figure 5:
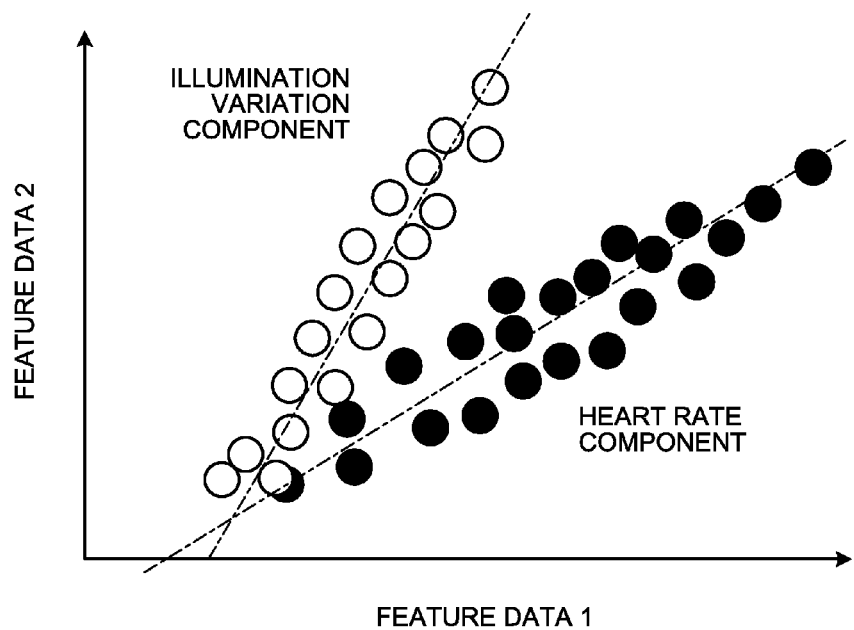
FIG. 5 is a diagram illustrating a signal component generated by a signal component separation unit according to an embodiment of the disclosure.

FIG. 5 is a diagram illustrating a signal component generated by the signal component separation unit according to an embodiment of the disclosure. The sensor sensitivity feature according to the present embodiment includes the first pixel for detecting the heart rate, having sensitivity in a wavelength band of 530 nm to 590 nm, and the second pixel for estimating illumination variation, that is, mainly for obtaining an illumination variation component, having sensitivity (peak) on both sides of the longer wavelength side and shorter wavelength side of the first pixel. The light received by the first pixel includes an illumination variation component of a waveband equal to the waveband of the heart rate component. In contrast, the second pixel receives the light that has sensitivity on the longer wavelength-side region and the shorter wavelength-side region outside the sensitivity of the heart rate component, and thus, can mainly obtain illumination variation of the wavelength component in the neighborhood of the sensitivity range of the first pixel. This makes it possible to simplify the illumination variation component and decrease overlapping in the signal components included in each of channels (first pixel and second pixel). Accordingly, it is possible, after conversion using ICA, or the like, into a feature data space of two sets of feature data (feature data 1 and 2) having a highest separation level, it is possible to separate the heart rate component (filled circles) and the illumination variation component (open circles) with high accuracy, as illustrated in FIG. 5.

Figure 6:
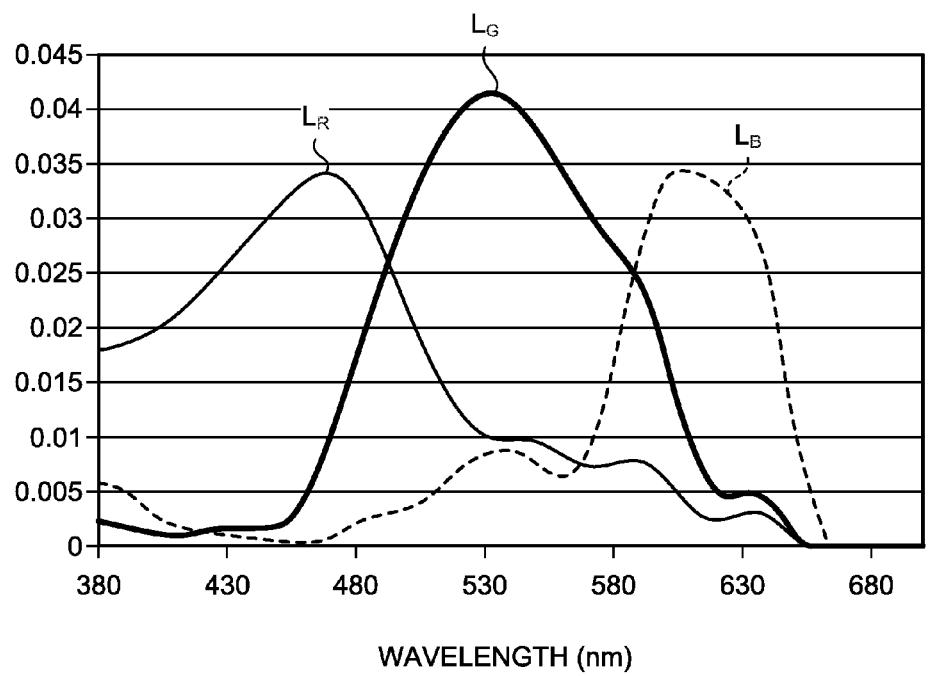
FIG. 6 is a diagram illustrating a sensitivity characteristic of each of pixels in a case where a typical RGB filter is used.

FIG. 6 is a diagram illustrating a sensitivity characteristic of each of pixels in a case where RGB filters provided in a typical imaging element are used. In FIG. 6, a sensitivity curve $L_R$ indicates a sensitivity characteristic of a pixel in which an R (red) filter is provided, a sensitivity curve $L_G$ indicates a sensitivity characteristic of a pixel in which a G (green) filter is provided, and a sensitivity curve $L_B$ represents a sensitivity characteristic of a pixel in which a B (blue) filter is provided. The sensitivity curve $L_R$ has a sensitivity characteristic of having a peak around 470 nm. The sensitivity curve $L_G$ has a sensitivity characteristic of having a peak around 530 nm. The sensitivity curve $L_B$ has a sensitivity characteristic of having a peak around 600 nm. Development of the imaging element including such RGB filters is inspired by physiological features of human eyes. Three types of cone cells included in the human retina receive actions as color stimulation, enhancing color gamut achieved by combining three types of signals. The imaging element having sensitivity for each of the wavelength bands of RGB is developed for the purpose of enhancing color reproducibility, and thus, there has not been sufficient consideration on detection of the heart rate and robustness against illumination variation at this time.

Figure 7:
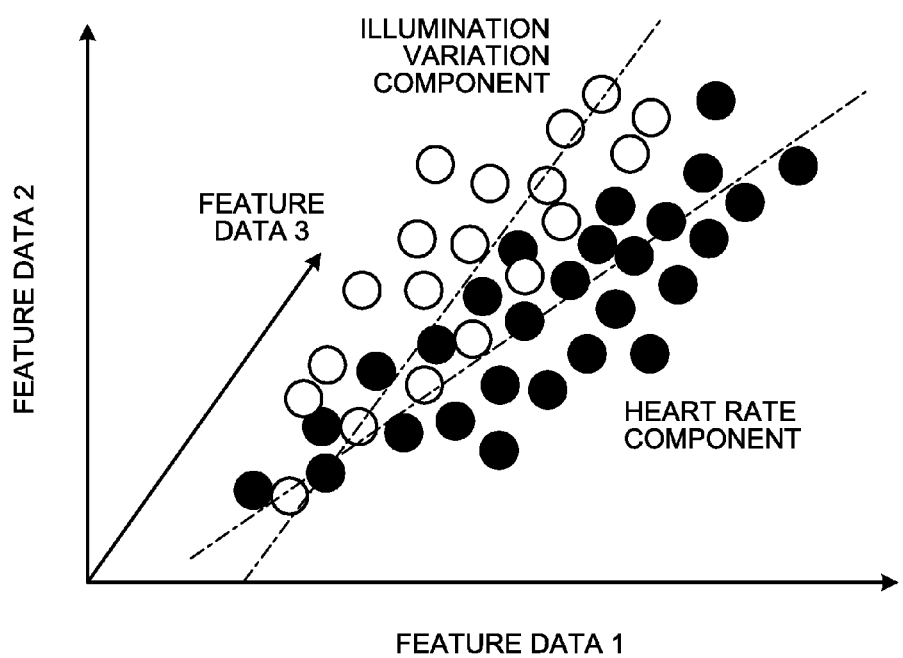
FIG. 7 is a diagram illustrating a signal component generated by a signal component separation unit using developed image data obtained by using a RGB filter.

An exemplary case where signal separation is performed with input of imaging signals from the imaging element having the RGB filter will be described. FIG. 7 is a diagram illustrating a signal component generated by the signal component separation unit using developed image data obtained in the case of using a RGB filter. FIG. 7 represents a result of plotting signals of the heart rate component (filled circles) and signals of the illumination variation component (open circles) onto three feature data axes, and, for example, represents a feature data space, in which, as the sensitivity characteristic illustrated in FIG. 6, when the input signals of the RGB channel are input and separation of the heart rate component and the illumination variation component is attempted using independent component analysis (ICA), the two components are most stochastically independent with each other. Even when conversion into spaces where the components are separated best is performed in this case, the signal of each of the RGB channels as original input includes the heart rate component and includes the illumination variation component (disturbance component) different depending on each of the channels. Since this causes overlapping of the signals of the heart rate component and the signals of the illumination variation component with each other in distribution, it is difficult to separate the heart rate component with high accuracy.

The frequency analysis unit 31 obtains a plurality of signal components from the signal component separation unit 30 and performs frequency analysis toward each of the components and calculates analysis data. The analysis data are output as a waveform indicating a relationship between time and the amplitude. As frequency analysis processing, known techniques such as Fourier transform and wavelet transform can be used.

Figure 8:
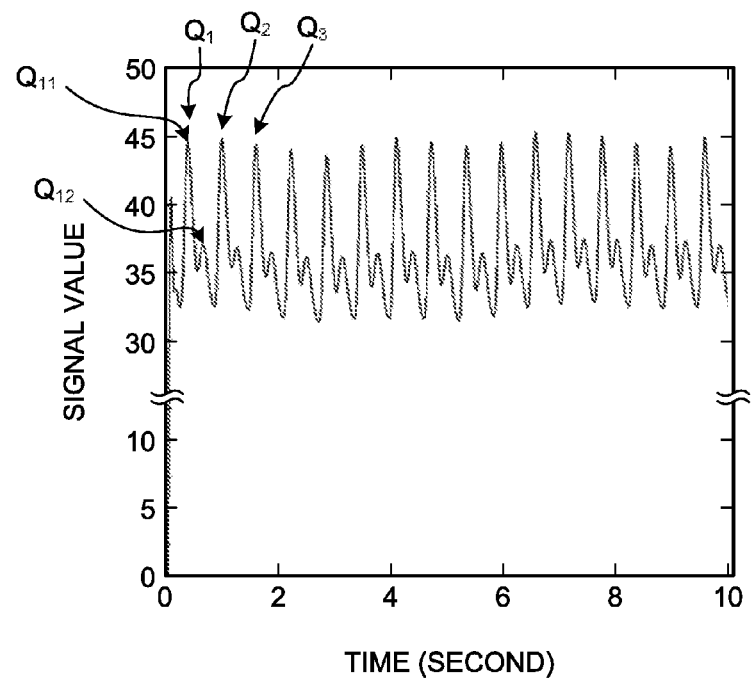
FIG. 8 is a diagram illustrating a result of pulse-wave measurement using a contact-type blood volume pulse (BVP) sensor.

FIG. 8 is a diagram illustrating a result of pulse-wave measurement using a contact-type blood volume pulse (BVP) sensor. In FIG. 8, the horizontal axis represents time and the vertical axis represents the signal value. FIG. 8 indicates a measurement result in the wavelength band of 400 nm to 560 nm. As illustrated in FIG. 8, there are three peaks (peaks $Q_1$, $Q_2$, and $Q_3$) within a range of 0 to 2 seconds in the measurement result obtained by the BVP sensor. Additionally, each of the peaks has two peaks. For example, the peak $Q_1$ has a first peak $Q_{11}$, and a second peak $Q_{12}$.

Figure 9:
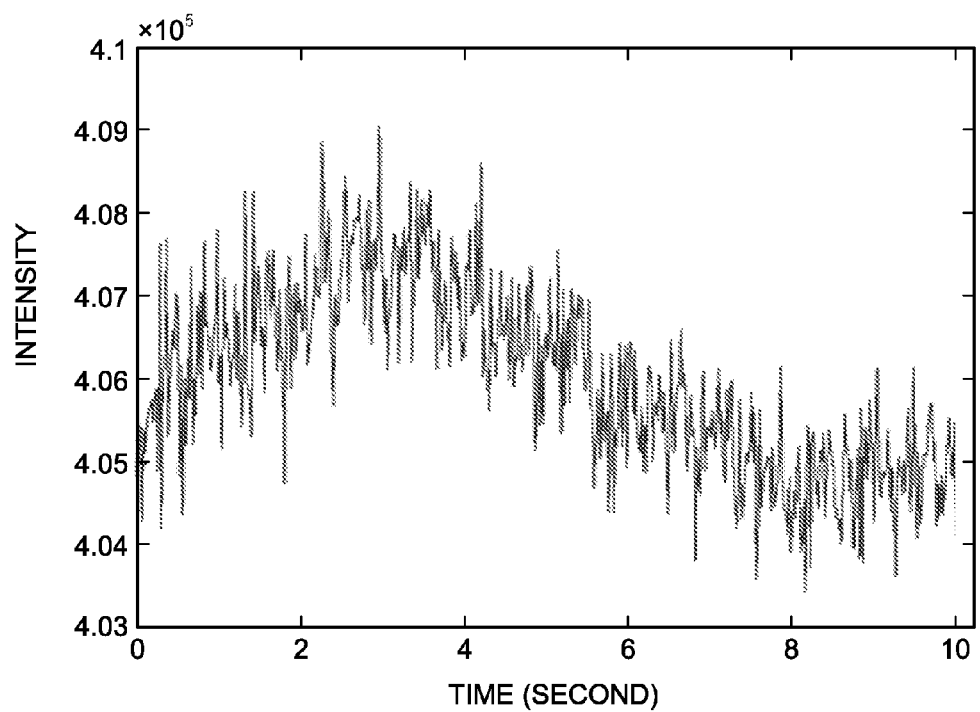
FIG. 9 is a diagram illustrating an analysis result of signal component separation and frequency analysis on the basis of an imaging signal (RAW image data)
Figure 10:
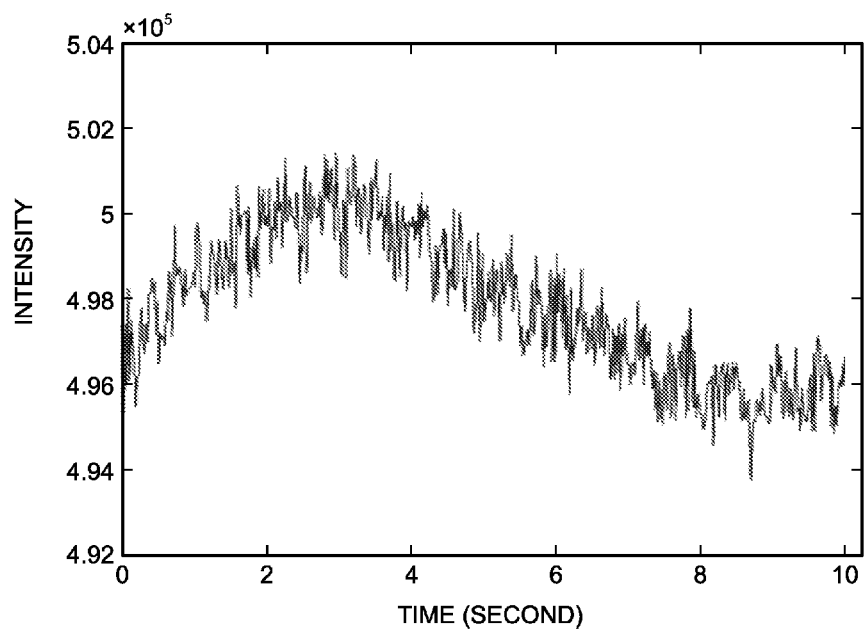
FIG. 10 is a diagram illustrating an analysis result of signal component separation and frequency analysis on the basis of an imaging signal (RAW image data)
Figure 11:
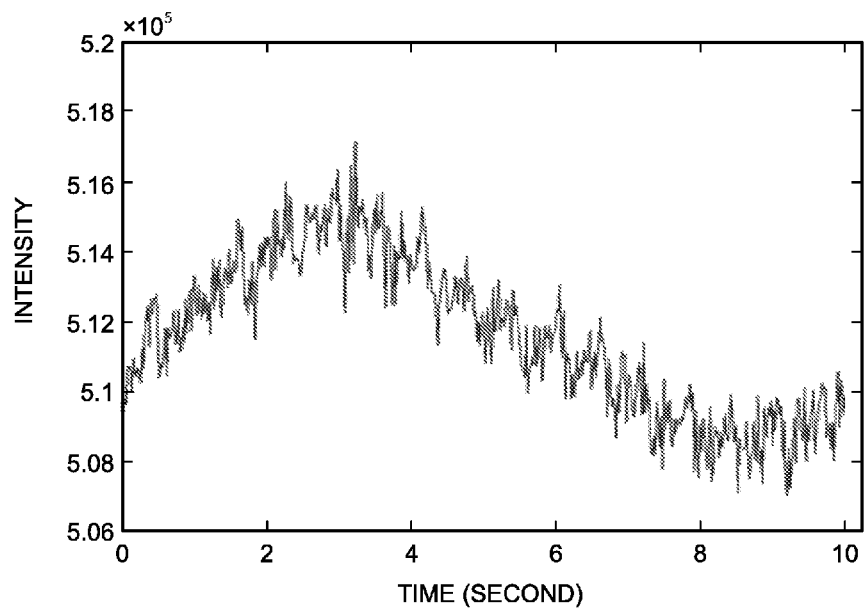
FIG. 11 is a diagram illustrating an analysis result of signal component separation and frequency analysis on the basis of an imaging signal (RAW image data)
Figure 12:
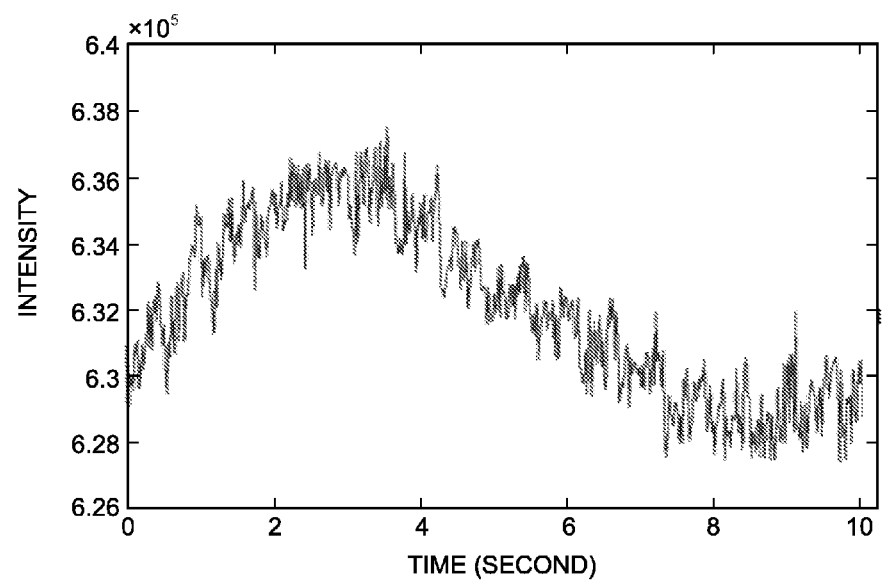
FIG. 12 is a diagram illustrating an analysis result of signal component separation and frequency analysis on the basis of an imaging signal (RAW image data)
Figure 13:
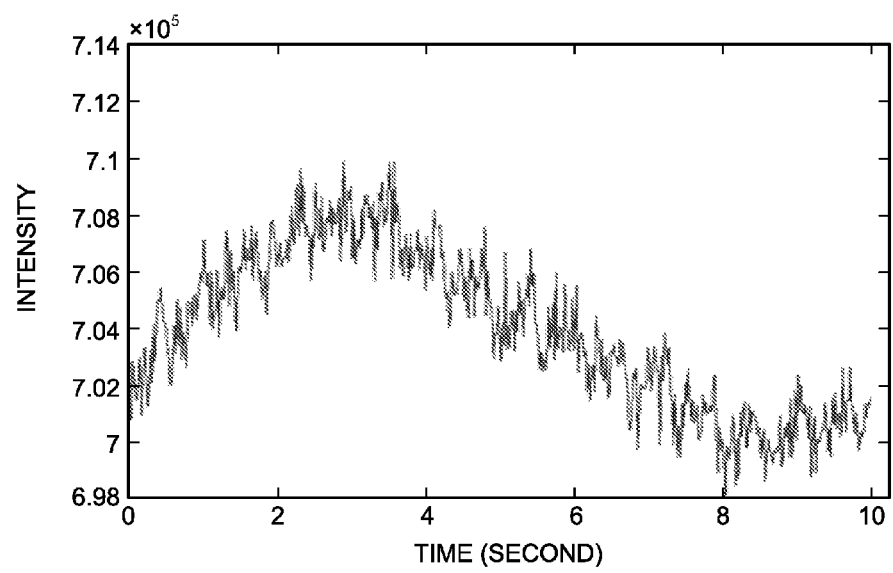
FIG. 13 is a diagram illustrating an analysis result of signal component separation and frequency analysis on the basis of an imaging signal (RAW image data)
Figure 14:
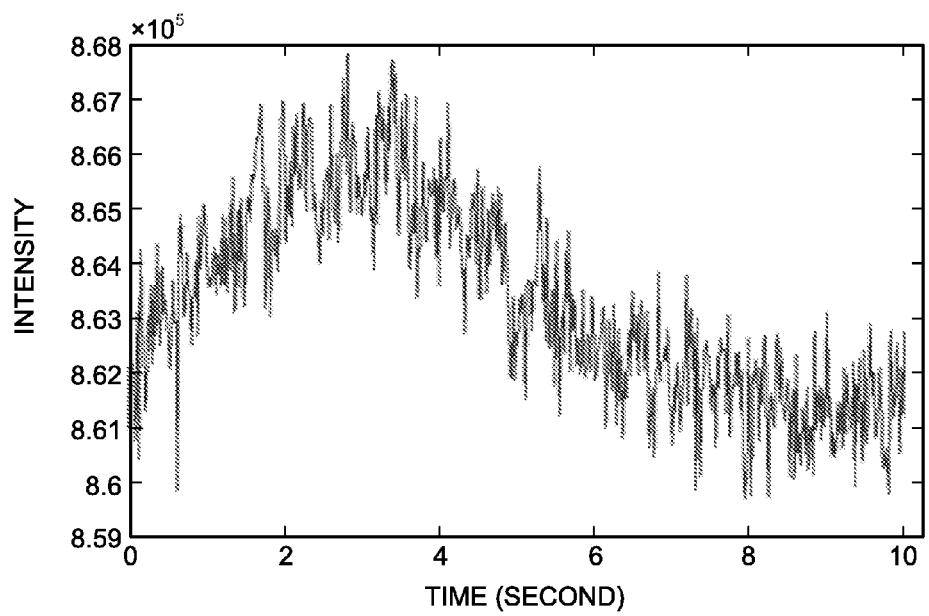
FIG. 14 is a diagram illustrating an analysis result of signal component separation and frequency analysis on the basis of an imaging signal (RAW image data)
Figure 15:
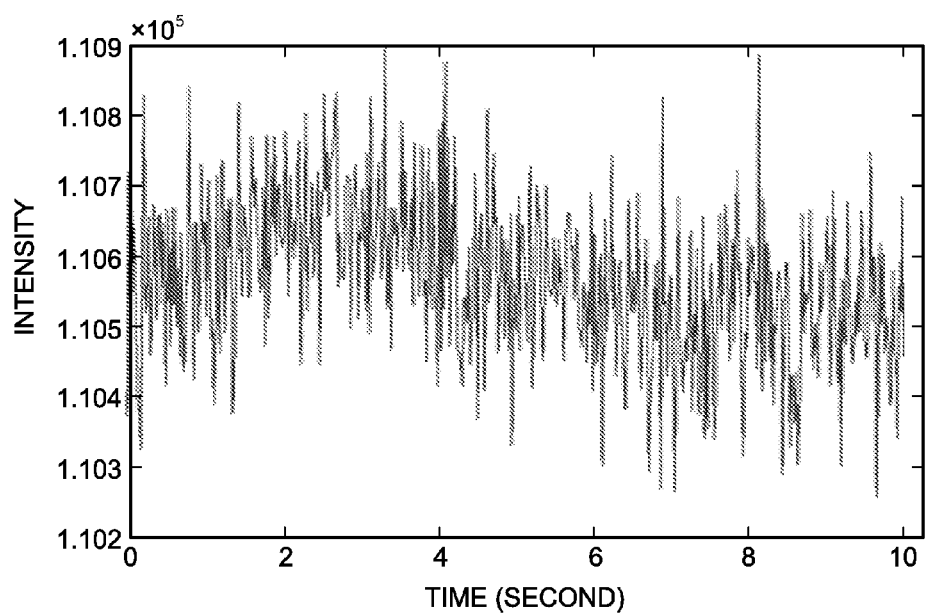
FIG. 15 is a diagram illustrating an analysis result of signal component separation and frequency analysis on the basis of an imaging signal (RAW image data)

FIGS. 9 to 15 are diagrams each illustrating an analysis result of signal component separation and frequency analysis on the basis of an imaging signal (RAW image data). In FIGS. 9 to 15, the horizontal axis represents time and the vertical axis represents intensity. FIG. 9 represents a frequency analysis result at the wavelength band of 500 nm to 510 nm. FIG. 10 represents a frequency analysis result at the wavelength band of 520 nm to 530 nm. FIG. 11 represents a frequency analysis result at the wavelength band of 530 nm to 540 nm, FIG. 12 represents a frequency analysis result at the wavelength band of 560 nm to 570 nm. FIG. 13 represents a frequency analysis result at the wavelength band of 580 nm to 590 nm. FIG. 14 represents a frequency analysis result at the wavelength band of 590 nm to 600 nm. FIG. 15 represents a frequency analysis result at the wavelength band of 610 nm to 620 nm.

Note that it is possible to extract the above-described peak (refer to FIG. 8) in the analysis result at the wavelength band of 530 nm to 590 nm (refer to FIGS. 11 to 13). In contrast, it is difficult to detect the above-described peak from the analysis result at each of the wavelength bands of 500 nm to 510 nm (refer to FIG. 9), 520 nm to 530 nm (refer to FIG. 10), 590 nm to 600 nm (FIG. 14), and 610 nm to 620 nm (refer to FIG. 15).

Figure 16:
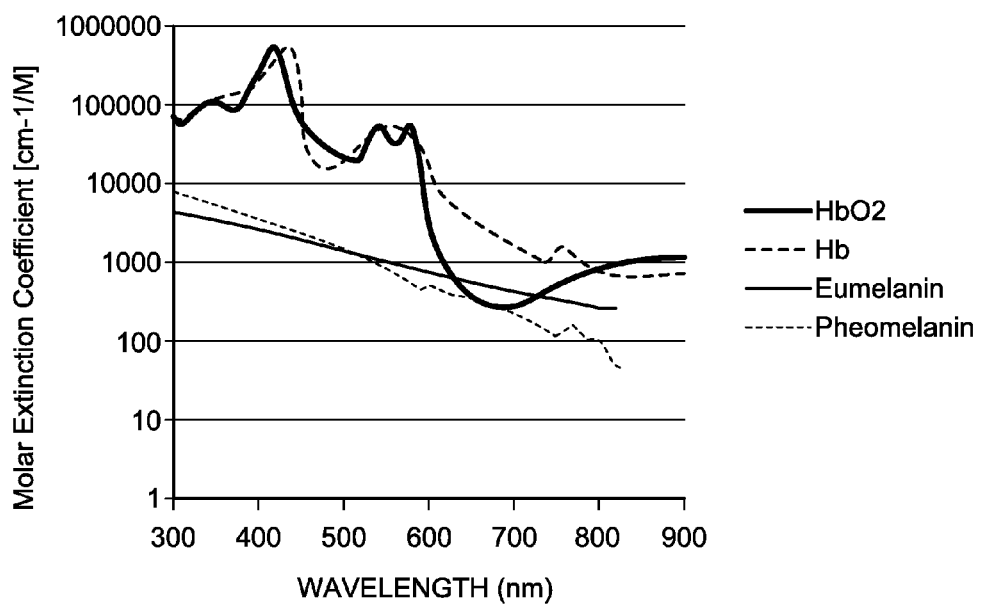
FIG. 16 is a diagram illustrating molar absorptivity of hemoglobin ($HbO_2$ and Hb) and melanin (eumelanin and pheomelanin)

The reason why the analysis result of the wavelength band of 530 nm to 590 nm is suitable for heart rate detection will be described with reference to FIG. 16. FIG. 16 is a diagram illustrating molar absorptivity of hemoglobin ($HbO_2$, and Hb) and melanin (eumelanin and pheomelanin). Reflection on the skin includes direction reflection and diffuse reflection and the diffuse reflection is dominant. The diffuse reflection corresponds to the light that has once been taken into the skin and reflected for a plurality of times and then leaks from a surface layer. At this time, when the light is absorbed, the light that leaks to the skin surface would be decreased. Moreover, when the heart rate varies, the blood flow rate in a vessel also varies. The blood includes hemoglobin, which has different light absorption characteristics depending on the wavelength, as illustrated in FIG. 16. As illustrated in FIG. 16, hemoglobin has a strong absorption characteristic at a range of 530 nm to 590 nm, and this leads to variation of diffuse reflection amount at the surface layer along with heart rate variation. Meanwhile, hemoglobin has also a great absorption characteristic at around 400 nm. This range, however, also has a strong absorption characteristic for melanin. In addition, it has an effect of Rayleigh scattering that scales inversely with the fourth power of the wavelength, and thus, would lead to a small amount of light that reaches the vascular site of the dermis. Accordingly, the wavelength band of 530 nm to 590 nm can be considered to be more suitable for detection of the heart rate. From the above, the present embodiment determines the sensitivity range of the first pixel $P_1$ to be the wavelength band of 530 nm to 590 nm.

Figure 17:
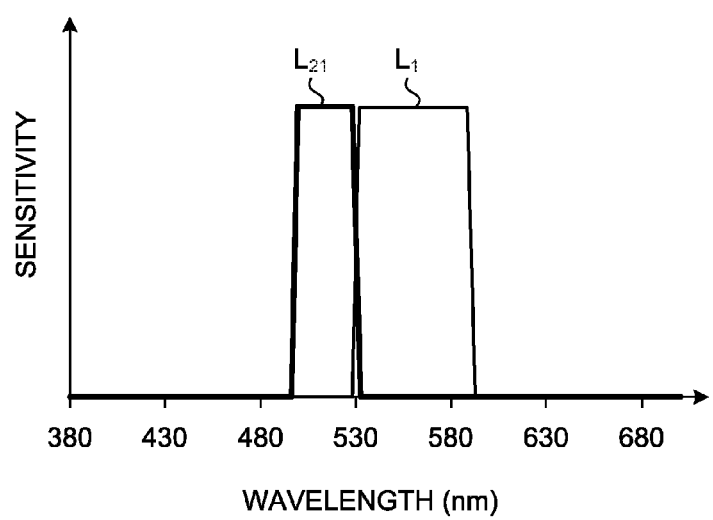
FIG. 17 is a diagram illustrating an exemplary sensitivity characteristic of a second pixel.
Figure 18:
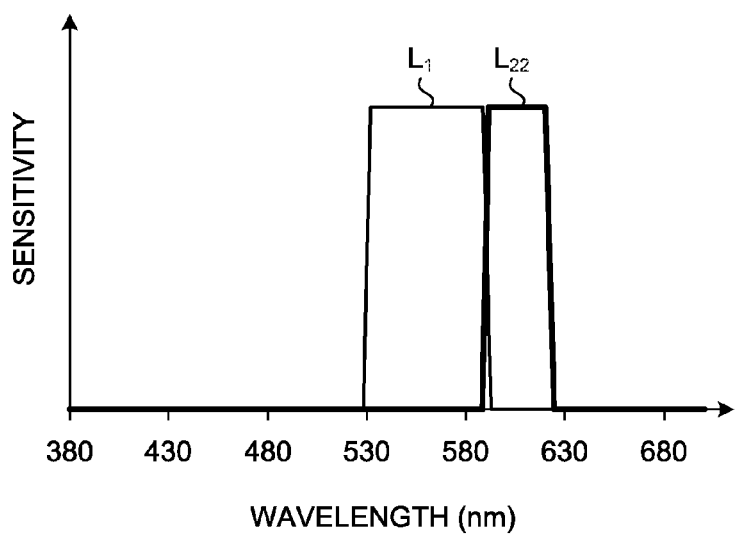
FIG. 18 is a diagram illustrating an exemplary sensitivity characteristic of the second pixel.

Next, the reason, in the sensitivity characteristic of the second pixel, why it is advantageous to have sensitivity on the wavelength band on the both sides of the sensitivity range 530 nm to 590 nm of the first pixel, that is, the longer wavelength side and the shorter wavelength side (500 nm to 530 nm and 590 nm to 620 nm) will be described. FIGS. 17 and 18 are diagrams illustrating an exemplary sensitivity characteristic of the second pixel. In FIGS. 17 and 18, the horizontal axis represents wavelength (nm) and the vertical axis represents sensitivity. FIG. 17 indicates a case where the filter provided for the second pixel is a third filter having a characteristic of transmitting light having a wavelength band of 500 nm to 530 nm (uniquely a first curve $L_{21}$). Moreover, FIG. 18 indicates a case where the filter provided for the second pixel is a fourth filter having a characteristic of transmitting light having a wavelength band of 590 nm to 620 nm (uniquely a second curve $L_{22}$).

In a case where the third filter illustrated in FIG. 17 is used, the second pixel is configured such that the third filter transmits the light having wavelength band of 500 nm to 530 nm, and thus, has sensitivity (peak) toward the wavelength band of 500 nm to 530 nm. In contrast, in a case where the fourth filter illustrated in FIG. 18 is used, the second pixel is configured such that the fourth filter transmits the light having wavelength band of 590 nm to 620 nm, and thus, has sensitivity (peak) toward the wavelength band of 590 nm to 620 nm.

FIGS. 19 to 26 are diagrams each illustrating a relationship between the sensitivity characteristic of the second pixel and heart rate detection. In FIGS. 19 to 26, the horizontal axis represents time and the vertical axis represents amplitude.

Figure 19:
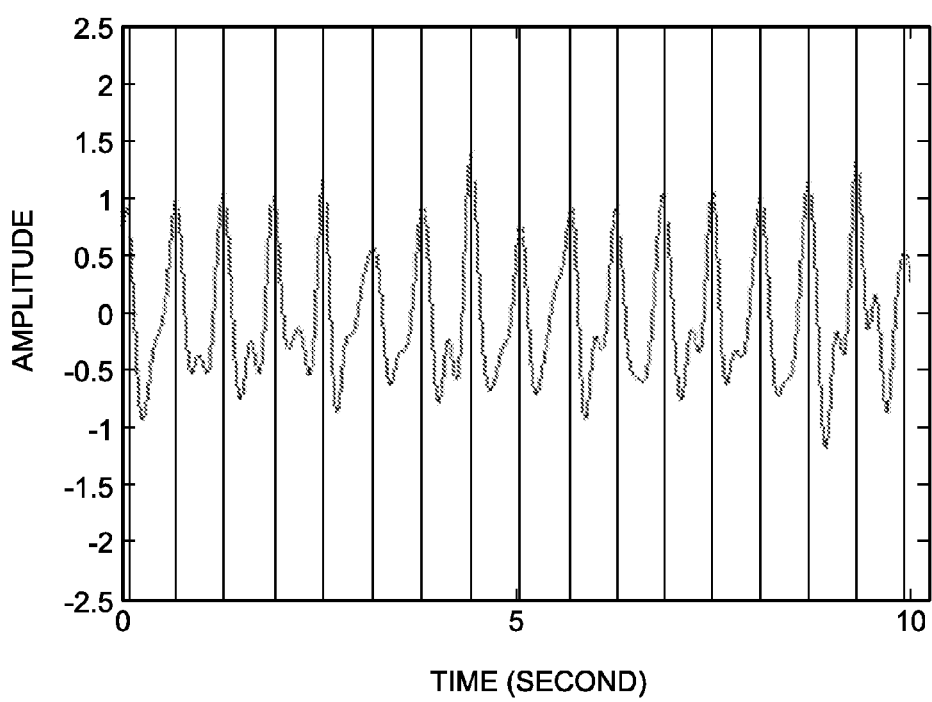
FIG. 19 is a diagram illustrating a relationship between the sensitivity characteristic of the second pixel and heart rate detection.
Figure 22:
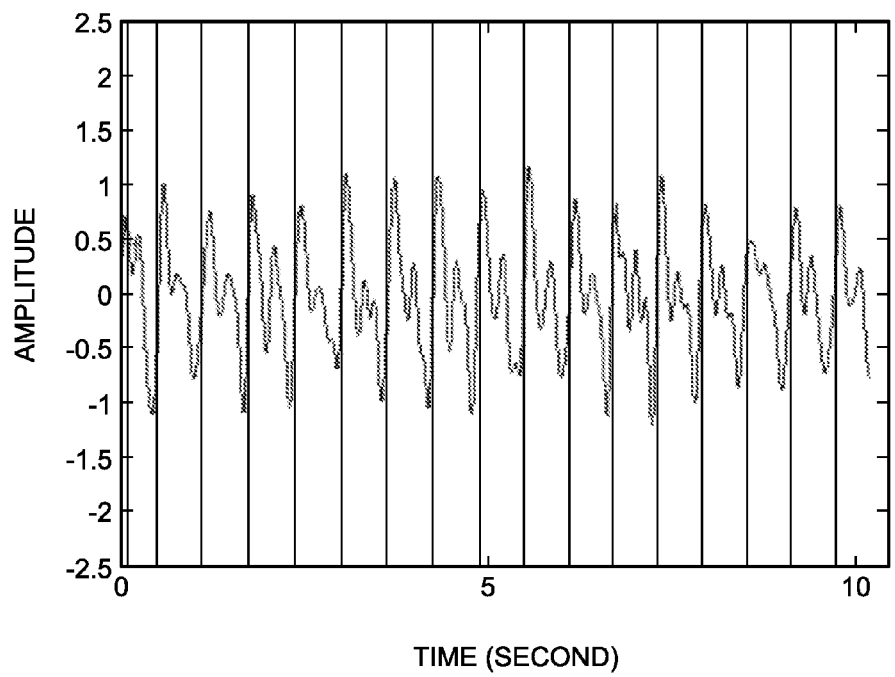
FIG. 22 is a diagram illustrating a relationship between the sensitivity characteristic of the second pixel and heart rate detection.

FIG. 19 is a diagram illustrating analysis data obtained in a case where RGB filters provided in a typical imaging element is used. FIG. 20 is a diagram illustrating an analysis result in a case where the sensitivity characteristic of the second pixel is provided uniquely on the shorter wavelength side of the sensitivity range of the first pixel (third filter) and where no sensitivity is present on the longer wavelength side. FIG. 21 is a diagram illustrating an analysis result in a case where the sensitivity characteristic of the second pixel is provided uniquely on the longer wavelength side of the sensitivity range of the first pixel (fourth filter) and where no sensitivity is present on the shorter wavelength side. FIG. 22 is a diagram illustrating an analysis result in a case where the sensitivity characteristic of the second pixel is provided on the longer wavelength side and the shorter wavelength side of the sensitivity range of the first pixel. FIGS. 19 to 22 illustrate analysis results when tungsten light is used as illumination.

Figure 23:
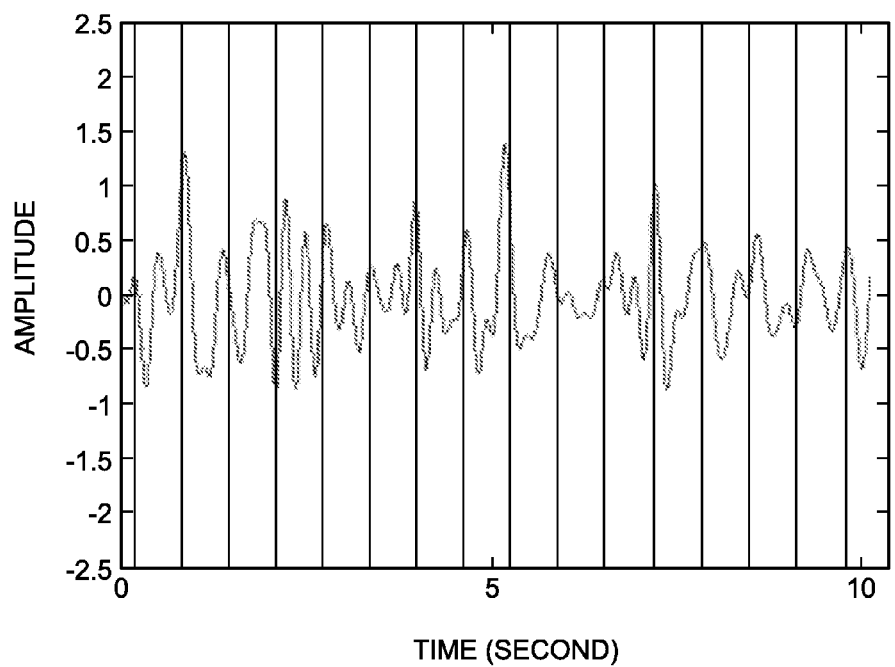
FIG. 23 is a diagram illustrating a relationship between the sensitivity characteristic of the second pixel and heart rate detection.
Figure 24:
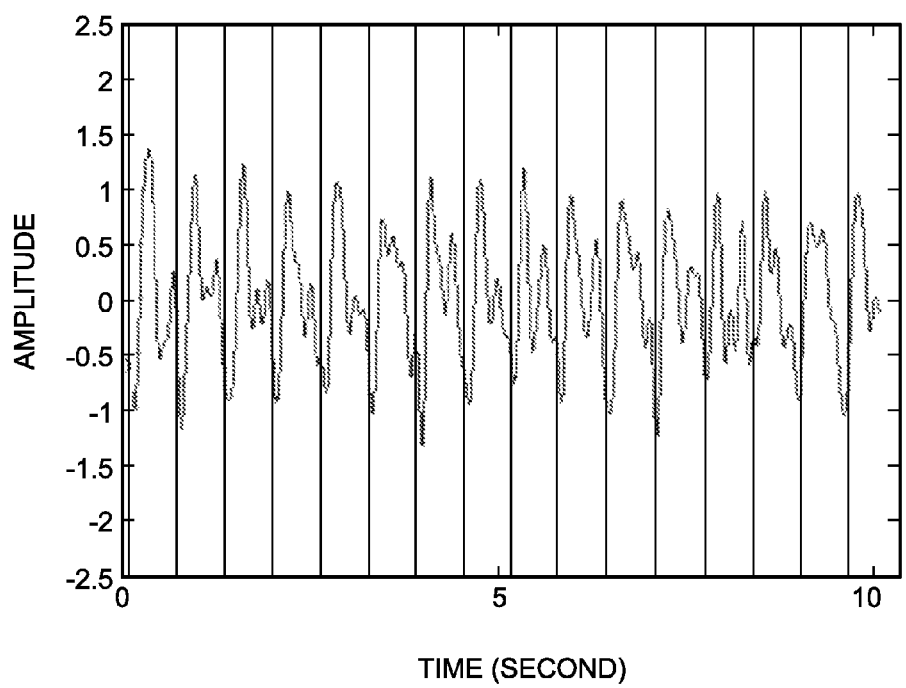
FIG. 24 is a diagram illustrating a relationship between the sensitivity characteristic of the second pixel and heart rate detection.
Figure 25:
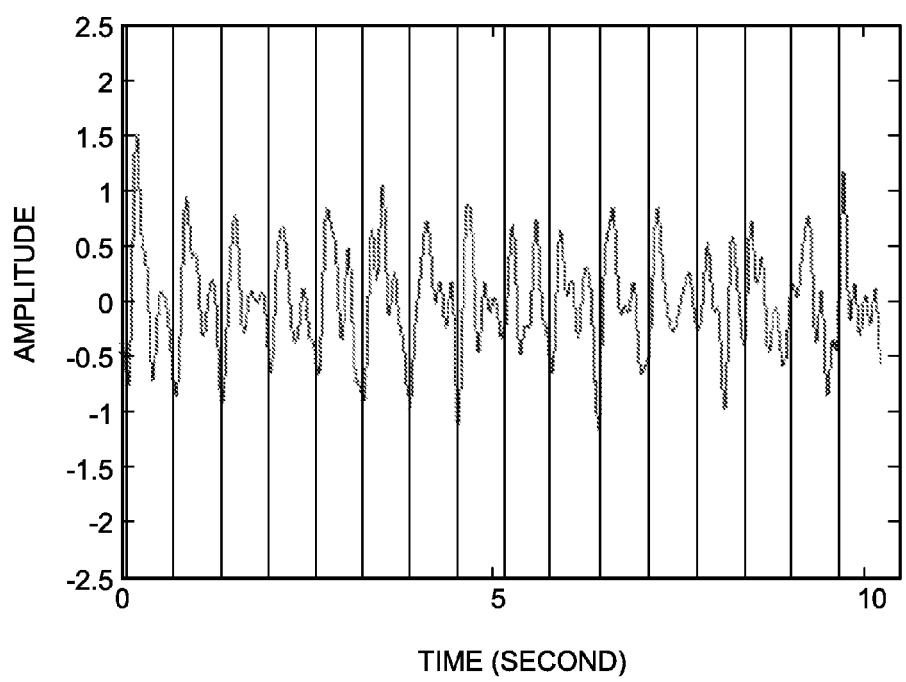
FIG. 25 is a diagram illustrating a relationship between the sensitivity characteristic of the second pixel and heart rate detection.
Figure 26:
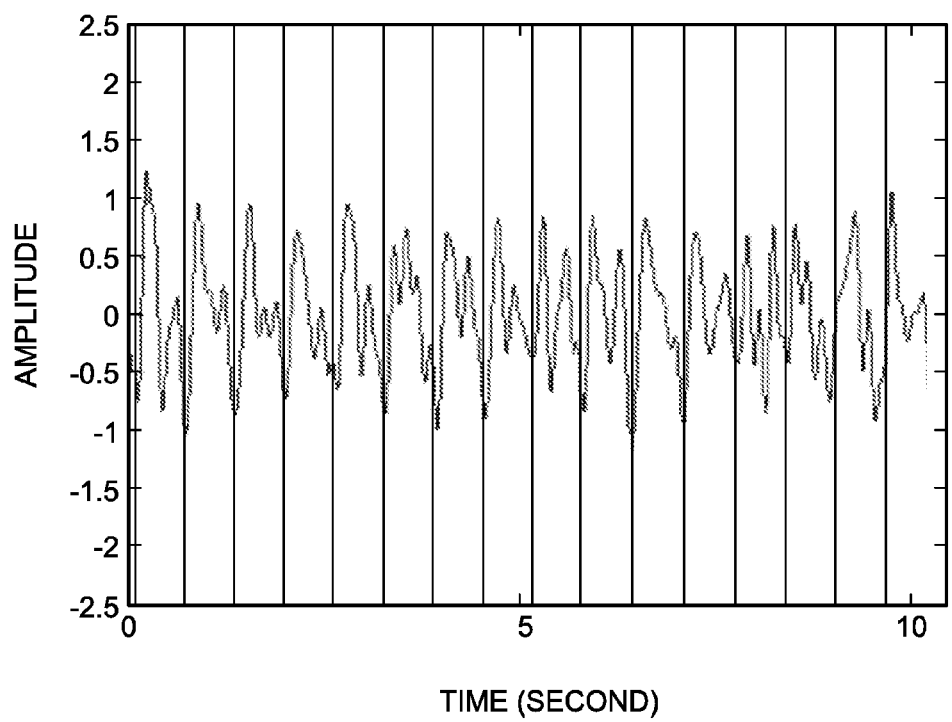
FIG. 26 is a diagram illustrating a relationship between the sensitivity characteristic of the second pixel and heart rate detection.

FIG. 23 is a diagram illustrating analysis data obtained in a case where RGB filters provided in a typical imaging element is used. FIG. 24 is a diagram illustrating an analysis result in a case where the sensitivity characteristic of the second pixel is provided uniquely on the shorter wavelength side of the sensitivity range of the first pixel (third filter) and where no sensitivity is present on the longer wavelength side. FIG. 25 is a diagram illustrating an analysis result in a case where the sensitivity characteristic of the second pixel is provided uniquely on the longer wavelength side of the sensitivity range of the first pixel (fourth filter) and where no sensitivity is present on the shorter wavelength side. FIG. 26 is a diagram illustrating an analysis result in a case where the sensitivity characteristic of the second pixel is provided on the longer wavelength side and the shorter wavelength side of the sensitivity range of the first pixel. FIGS. 23 to 26 illustrate analysis results when a fluorescent light is used as illumination.

In a case where the RGB filter is used as illustrated in FIGS. 19 and 23, the second peak cannot be detected although the first peak can be detected, with any of the illumination types.

In another case where the tungsten light is used for illumination, although good heart rate detection results can be obtained at the fourth filter (uniquely on the longer wavelength side), (refer to FIG. 21), good heart rate detection results cannot be obtained at the third filter (uniquely on the shorter wavelength side) (FIG. 20).

In another case where the fluorescent light is used for illumination, although good heart rate detection results can be obtained at the third filter (uniquely on the shorter wavelength side) (refer to FIG. 24), good heart rate detection results cannot be obtained at the fourth filter (uniquely on the longer wavelength side) (refer to FIG. 25).

In contrast, as illustrated in FIGS. 22 and 26, in the case of the second pixel having the sensitivity characteristic on the longer wavelength side and shorter wavelength side of the sensitivity range of the first pixel, good heart rate detection results can be obtained in any of the illumination types. In short, while the illumination variation component according to illumination environment cannot be obtained in some cases where the sensitivity range of the second pixel is provided uniquely to one side of the wavelength band of the sensitivity range of the first pixel, it would be possible to robustly extract the heart rate component against illumination variation by providing the sensitivity of the second pixel to both sides of the sensitivity range of the first pixel.

Figure 27:
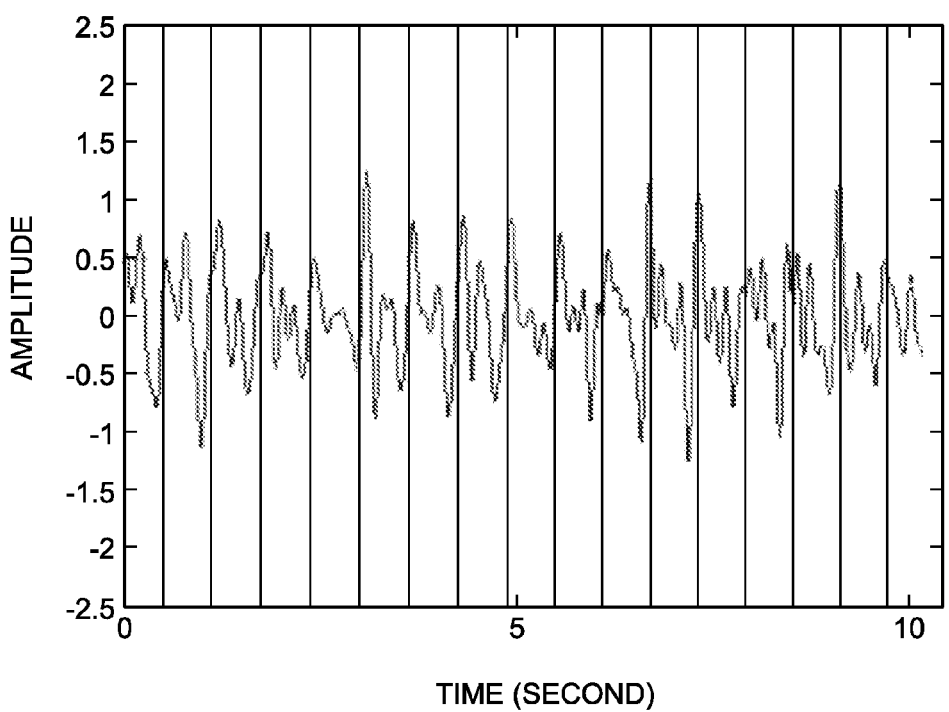
FIG. 27 is a diagram illustrating an analysis result in a case where a sensitivity range of the second pixel is on the wavelength band of 470 nm to 530 nm on a short wavelength side of a first pixel and is on the wavelength band of 590 nm to 650 nm on a longer wavelength side of the first pixel.

FIG. 27 is a diagram illustrating an analysis result in a case where a sensitivity range of the second pixel is in the wavelength band of 470 nm to 530 nm on a shorter wavelength side of a first pixel and is the wavelength band of 590 nm to 650 nm on a longer wavelength side of the first pixel. FIG. 27 illustrates an analysis result in a case where tungsten light is used as illumination. Each of the width of a first sensitivity region on the shorter wavelength side and the width of the sensitivity region on the longer wavelength side is 60 nm, the same width as the width of the sensitivity range of the first pixel $P_1$. As illustrated in FIG. 27, it can be confirmed that, when the width of the sensitivity range of the second pixel increases, there may be a case where heart rate detection is not possible, and thus, the wider the width of the sensitivity region of the second pixel, the more the number of maximum position of heart rate detection and the more unstable the processing (analysis result) becomes. Therefore, it would be preferable that the width of the sensitivity range of the second pixel, that is, the width of the sensitivity region on the shorter wavelength side and the width of a second sensitivity region on the longer wavelength side is smaller than the width of the sensitivity region of the first pixel.

Returning to FIG. 1, the signal selector 32 selects a signal component for generating vital information as biological information of the face region included in the developed image that corresponds to the developed image data, on the basis of the analysis result by the frequency analysis unit 31. Herein, the vital information indicates any of the heart rate, oxygen saturation, and blood pressure. Specifically, it is known that the normal heart rate ranges from 50 to 140 beats/minute. Using this previously known information, the signal selector 32 selects a signal component in which amplitude (intensity) periodically varies at a same cycle, as a heart rate waveform. The previously known information may be stored in the recording unit 35 beforehand or may be obtained via a network.

The output unit 33 outputs information based on a heart rate waveform selected by the signal selector 32. The information includes an image of the heart rate waveform to be displayed on a monitor, or the like, a numerical value obtained from the heart rate waveform, and textual information. The monitor includes a display panel formed with liquid crystal, organic electro luminescence (EL), or the like. It is also allowable to print and output the numerical value and the textual information.

The control unit 34 integrally controls operation of the biological information measurement apparatus 1 by issuing instruction or performing data transfer, to each of components of the biological information measurement apparatus 1. The control unit 34 is formed with a central processing unit (CPU), or the like.

The recording unit 35 records various types of information related to the biological information measurement apparatus 1. The recording unit 35 records image data generated by the imaging element 22, various programs related to the biological information measurement apparatus 1, parameters related to processing under execution, or the like. The recording unit 35 is formed with a synchronous dynamic random access memory (SDRAM), a flash memory, a recording medium, or the like.

Figure 28:
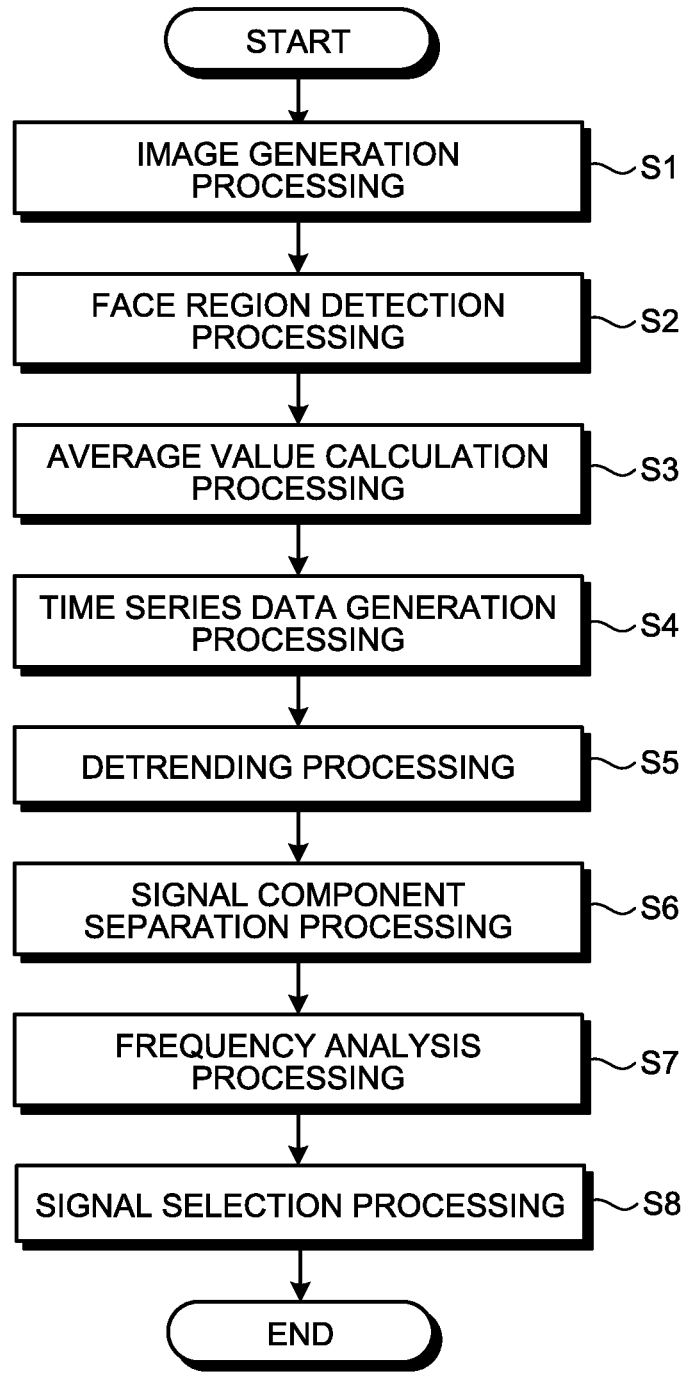
FIG. 28 is a flowchart illustrating processing performed by a biological information measurement apparatus according to an embodiment of the disclosure.

Subsequently, processing executed by each of components of the biological information measurement apparatus 1 will be described with reference to the drawings. FIG. 28 is a flowchart illustrating processing performed by the biological information measurement apparatus 1 according to an embodiment of the disclosure. Hereinafter, description will be given on the assumption that each of the components operates under the control of the control unit 34.

First, the image generation unit 25 obtains RAW image data generated by the A/D converter 24, performs image generation processing onto the data, and generates developed image data in which each of the pixels is provided with first luminance that corresponds to the light transmitted through the first filter and with second luminance that corresponds to the light transmitted through the second filter (step S1). The image generation unit 25 inputs generated developed image data into each of the face detection unit 26 and the average value calculation unit 27.

When the developed image data are input from the image generation unit 25, the face detection unit 26 detects, using a known method such as pattern matching, a region (hereinafter, also referred to as a face region) including the face of the subject, included in the image that corresponds to the developed image data input from the image generation unit 25 and inputs the detection result into the average value calculation unit 27.

The face detection unit 26 detects the face region included in the image that corresponds to the developed image data input from the image generation unit 25 (step S2). The face detection unit 26 inputs a result of detection into the average value calculation unit 27.

The average value calculation unit 27 obtains the developed image data generated by the image generation unit 25 and the detection result of the face region detected by the face detection unit 26, and calculates an average value of each of the first and second luminance values on the face region (step S3).

The time series data generation unit 28 generates first time series data (step S4) by connecting, in time series, the average values of the first luminance of a fixed period of time (fixed number of frames), calculated by the average value calculation unit 27, and generates second time series data (step S4) by connecting, in time series, the average value of the second luminance of a fixed period of time (fixed number of frames), calculated by the average value calculation unit 27. The time series data generation unit 28 inputs the generated average values into the detrending unit 29.

Thereafter, on the basis of the first and second time series data generated by the time series data generation unit 28, the detrending unit 29 generates the first and second time series data from which an offset component (trend) varying over time has been removed (step S5).

The signal component separation unit 30 obtains the detrended first and second time series data from the detrending unit 29 and separates a plurality of signal components from each of the first and second time series data (step S6).

The frequency analysis unit 31 obtains a plurality of signal components from the signal component separation unit 30 and performs frequency analysis toward each of the components and calculates analysis data (step S7).

Thereafter, the signal selector 32 selects a signal component for generating vital information on the face region included in the developed image that corresponds to the developed image data, on the basis of the analysis result by the frequency analysis unit 31 (step S8). On the basis of the selected image data, the signal selector 32 creates an image of the heart rate waveform to be displayed on the monitor, or the like, a numerical values obtained from the heart rate waveform, textual information, or the like. The output unit 33 outputs information based on a heart rate waveform selected by the signal selector 32.

According to the above-described present embodiment, using the imaging element 22 including the first pixel $P_1$ having a wavelength band of 530 nm to 590 nm as a sensitivity range and the second pixel $P_2$ having a wavelength bands (500 nm to 530 nm, and 590 nm to 620 nm) on both sides, that is, the longer wavelength side and the shorter wavelength side, of the sensitivity range 530 nm to 590 nm of the first pixel $P_1$, as a sensitivity range, the time series data generation unit 28 generates time series data from the imaging signal obtained by each of the first and second pixels of the imaging element 22, the signal component separation unit 30 separates the time series data into a plurality of signal components, and the signal selector 32 selects the signal components that corresponds to the biological information, among the plurality of signal components separated by the signal component separation unit 30. With this configuration, it is possible to separate the heart rate component from the illumination variation component with high accuracy, and to select the separated signal component, and thus, to stably detect biological information such as the heart rate, regardless of environment.

Modification Example of Embodiment

Figure 29:
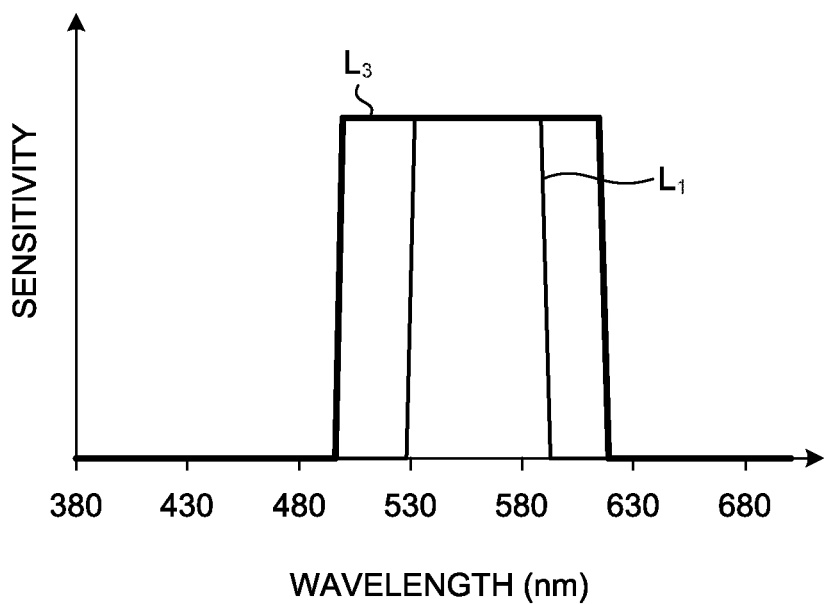
FIG. 29 is a diagram illustrating an exemplary sensitivity characteristic of an imaging element according to a modification example of the embodiment of the disclosure.

While the above-described embodiment assumes that mutually independent peaks exist on the shorter wavelength side and the longer wavelength side of the sensitivity range of the first pixel, the disclosure is not limited to this configuration. In the present modification example, it is allowable to configure such that the second pixel has a sensitivity in a wavelength band that includes the sensitivity region of the first pixel and across the band from the wavelength on the shorter wavelength side of the sensitivity range of the first pixel, over to the wavelength on the longer wavelength side of the sensitivity range of the first pixel. FIG. 29 is a diagram illustrating an exemplary sensitivity characteristic of an imaging element according to a modification example of the embodiment of the disclosure. In FIG. 29, the horizontal axis represents wavelength (nm) and the vertical axis represents sensitivity. Moreover, in FIG. 29, the curve $L_1$ represents a sensitivity characteristic of the first pixel $P_1$ in which the first filter is provided, and a curve $L_3$ represents a sensitivity characteristic of the second pixel $P_2$ in which a fifth filter that transmits the light of a wavelength band of 500 nm to 620 nm.

In the present modification example, the second pixel $P_2$ is configured such that the fifth filter transmits the light having the wavelength band of 500 nm to 620 nm, and thus, the curve $L_3$ has a peak at the wavelength band of 530 nm to 620 nm. In this manner, it is sufficient that the second pixel $P_2$ has a sensitivity characteristic of at least having sensitivity (peaks) toward the light of the wavelength band of 500 nm to 530 nm (shorter wavelength-side sensitivity range) and at the wavelength band of 590 nm to 620 nm (longer wavelength-side sensitivity range). Therefore, the sensitivities (peaks) of the two sensitivity ranges need not be separated from each other.

It is noted that the disclosure is not limited to the above-described embodiments just as they are but can be embodied by modifying the components without departing from the scope of the invention at a stage of implementation of the invention. Furthermore, a plurality of components disclosed in the above-described embodiments may be appropriately combined to form various inventions. For example, some components may be omitted from the all the components described in the embodiments and the modification example. Furthermore, the components described in each of the embodiments and modification examples may be appropriately combined with each other.

Moreover, while the above-described embodiment assumes that the average value calculation unit 27 calculates the average value of the luminance as the representative value of each of the first and second imaging signals, the value is not to be limited to the average value, but may be the total value of the luminance. In another case where the image captured is an image having a background of a uniform color and face detection is not necessary because the image is shot of an upper half of the body, it is allowable to calculate the representative value of the whole image without performing face detection.

Furthermore, the above-described embodiment assumes that the frequency analysis unit 31 performs frequency analysis on the separated signal components. However, in a case where the separated signal component has a periodical signal value pattern, or the like, it is allowable to configure such that the signal component separation unit 30 inputs the plurality of separated signal components into the signal selector 32 without performing frequency analysis.

According to some embodiments, it is possible to achieve an effect of stably detecting biological information such as a heart rate regardless of environment.

In this manner, the present invention in its broader aspects is not limited to the representative embodiments described herein. Accordingly, various modifications can be made without departing from the spirit or scope of the general inventive concept as defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A biological information measurement apparatus configured to measure biological information based on subject images obtained sequentially in time series, the apparatus comprising:
   a plurality of first pixels where each first pixel includes a sensitivity range in a hemoglobin absorption wavelength band and is configured to generate a first imaging signal based on received light;
   a plurality of second pixels where each second pixel includes a longer wavelength-side sensitivity range on a longer wavelength side of the sensitivity range of the first pixel and a shorter wavelength-side sensitivity range on a shorter wavelength side of the sensitivity range of the first pixel and is configured to generate a second imaging signal based on the received light, each of the longer wavelength-side sensitivity range and the shorter wavelength-side sensitivity range having a width smaller than the width of the sensitivity range of the first pixel;
   a time series signal generation unit configured to:
      generate a first time series signal by connecting representative values of first imaging signals in time series, the first imaging signals being generated in time series; and
      generate a second time series signal by connecting representative values of second imaging signals in time series, the second imaging signals being generated in time series;
   a signal component separation unit configured to separate a plurality of signal components from each of the first and second time series signals; and
   a biological information component selector configured to select a signal component in accordance with the biological information, among the plurality of signal components separated by the signal component separation unit.

2. The biological information measurement apparatus according to claim 1;
   wherein the second pixel has peaks at the longer wavelength-side sensitivity range and the shorter wavelength-side sensitivity range, the peaks being separated from each other.

3. The biological information measurement apparatus according to claim 1, further comprising:
   a frequency analysis unit configured to perform frequency analysis on the plurality of signal components,
   wherein the biological information component selector selects a signal component in accordance with the biological information based on the plurality of signal components and a result of analysis by the frequency analysis unit.

4. A biological information measurement method executed by a biological information measurement apparatus configured to measure biological information based on subject images obtained sequentially in time series, the method comprising:
   generating a first imaging signal based on received light by a plurality of first pixels where each first pixel includes a sensitivity range in a hemoglobin absorption wavelength band;
   generating a second imaging signal based on the received light by a plurality of second pixels where each second pixel includes a longer wavelength-side sensitivity range on a longer wavelength side of the sensitivity range of the first pixel and a shorter wavelength-side sensitivity range on a shorter wavelength side of the sensitivity range of the first pixel, each of the longer wavelength-side sensitivity range and the shorter wavelength-side sensitivity range having a width smaller than the width of the sensitivity range of the first pixel;
   generating a first time series signal by connecting representative values of first imaging signals in time series, the first imaging signals being generated in time series;
   generating a second time series signal by connecting representative values of second imaging signals in time series, the second imaging signals being generated in time series;
   separating a plurality of signal components from each of the first and second time series signals; and
   selecting a signal component in accordance with the biological information, among the plurality of signal components separated by the signal component separation unit.

5. A non-transitory computer-readable recording medium recording a biological information measurement program for measuring biological information based on subject images obtained sequentially in time series, the program instructing a computer to execute:
   generating a first imaging signal based on received light by a plurality of first pixels where each first pixel includes a sensitivity range in a hemoglobin absorption wavelength band;
   generating a second imaging signal based on the received light by a plurality of second pixels where each second pixel includes a longer wavelength-side sensitivity range on a longer wavelength side of the sensitivity range of the first pixel and a shorter wavelength-side sensitivity range on a shorter wavelength side of the sensitivity range of the first pixel, each of the longer wavelength-side sensitivity range and the shorter wavelength-side sensitivity range having a width smaller than the width of the sensitivity range of the first pixel;
   generating a first time series signal by connecting representative values of first imaging signals in time series, the first imaging signals being generated in time series;
   generating a second time series signal by connecting representative values of second imaging signals in time series, the second imaging signals being generated in time series;
   separating a plurality of signal components from each of the first and second time series signals; and selecting a signal component in accordance with the biological information, among the plurality of signal components separated by the signal component separation unit.

* * * * *